Patented Feb. 14, 1950

2,497,705

UNITED STATES PATENT OFFICE 2,497,705

COPOLYMERIZATION PRODUCT OF N-VINYL LACTAMS AND POLYMERIZABLE ESTERS, AND PROCESS FOR MAKING SAME

James H. Werntz, Wilmington, Del., assignor to E. I. du Pont de Nemours & Company, Wilmington, Del., a corporation of Delaware No Drawing. Application October 16, 1946, Serial No. 703,466

5 Claims. (Cl. 260—85.7)

This invention relates to new polymeric surface-active modifying agents and to a process for their manufacture.

This invention has as an object a new and valuable class of surface-active agents. Further objects reside in methods for obtaining these agents. Other objects will appear hereinafter.

The above objects are accomplished through the production of new water-soluble copolymers by copolymerizing a N-vinyl lactam with a polymerizable ester of a monocarboxylic acid, which ester contains at least 8 carbon atoms, in the proportion of at least 5 mols of the N-vinyl lactam for each mole of said ester.

I have discovered that these water-soluble copolymers are effective either as highly effective non-ionic or cationic surface-active agents. This unusual dual function of these new surface-active copolymers makes them especially useful in processing operations of the textile industry. For example, these copolymers function as scouring agents in neutral or mildly alkaline solution while in acid solution, they function as softening agents and dyeing assistants for cellulosic materials. An added advantage is their relatively low cost.

These water-soluble copolymers can be obtained by heating at polymerizing temperature, e. g., from 40° C. to 250° C., in the presence of a polymerization catalyst the N-vinyl lactam and the above described ester in proportions of 5 to 30 moles of the N-vinyl lactam to one mole of the ester.

The practice of this invention is illustrated by the following examples in which parts are by weight unless otherwise indicated.

Example I

The clear solution obtained on mixing together 100 parts of N-vinylbutyrolactam (N-vinyl-alpha-pyrrolidone, B. P. 98° C./14 mm.), 20 parts of vinyl laurate and 1 part of azobisisobutyronitrile was placed in a glass reactor, the reactor sealed and then heated at 70–80° C. for 30 minutes. After cooling, the reactor was opened and the contents discharged, whereupon approximately a quantitative yield of transparent solid copolymer was obtained. This copolymer dissolved in water to give a solution which sudsed strongly, in contrast to a similar aqueous solution of N-vinylbutyrolactam polymer which did not foam.

Five parts of about an 0.2% aqueous solution of the copolymer in which was immersed a small strip of standard soiled cotton fabric was shaken intermittently for about 3 hours, during which time the aqueous solution became discolored by the soil removed from the test fabric. Furthermore, on removal from the aqueous copolymer solution and air-drying, the test fabric was of much lighter color than that of the unlaundered soiled fabric. The cleansing power of this copolymer solution appears to be about equal to that of the commercial synthetic detergent containing a sodium hydrocarbon sulfonate as the active ingredient.

Example II

A reaction mixture prepared as described in Example I was heated in an open glass vessel for 20 minutes at 60–70° C. The tough, colorless, rubber-like polymer which resulted, dispersed slowly in tepid water to give a sudsing solution. This product, however, was not as soluble in water as the copolymer of Example I. It dissolved more readily in 10 percent aqueous acetic acid than in water.

Vinyl laurate containing 1% of its weight of azobisisobutyronitrile as a catalyst does not polymerize when heated in an open glass vessel at 60–70° C., whereas N-vinyl-butyrolactam under similar conditions polymerizes to a water-soluble resin, which as previously noted under Example I, does not exhibit the surface-active property of foaming in aqueous solution.

Although the invention has, for illustrative purposes, been described with particular reference to vinyl laurate, it is, in general, operable with any polymerizable ester of a monocarboxylic acid in which said ester contains at least 8 carbon atoms. The vinyl esters of monocarboxylic acids, especially the aliphatic monocarboxylic acids, and the acrylates and methacrylates containing a total of at least 8 carbon atoms and wherein the hydrocarbon substituent (R) of the ester radical (COOR) is alkyl, are preferred since these are the most readily available and ordinarily give the most useful surface-active copolymers by the process of this invention. Examples of esters which can be employed in the practice of this invention include the vinyl esters of caproic, caprylic, lauric, palmitic, stearic, oleic, erucic, arachidic, cerotic and the like acids and the amyl, hexyl, cyclohexyl, heptyl, 2-ethylhexyl, dodecyl, octyl, tetradecyl, pentadecyl-8, hexadecyl, octadecyl, oleyl, arachidyl, and ceryl esters of acrylic and methacrylic acids, as well as the n-butyl and isobutyl esters of methacrylic acid. In general, it is preferred to use polymerizable esters of 8 to 30 carbon atoms.

Among the variety of N-vinyl lactams which can be employed in this invention, the N-vinyl derivatives of gamma-, delta-, and epsilon-lactams (that is, N-vinyl derivatives of the cyclic amides of gamma-, delta-, and epsilon-amino carboxylic acids of the aliphatic series) are preferred because, in general, these react most readily. Examples of these N-vinyl lactams include N-vinyl-alpha-pyrrolidone, N-vinyl-delta-methylpyrrolidone, N-vinyl-beta, beta-dimethyl-pyrrolidone, N-vinyl-alpha-piperidone, N-vinyl-epsilon-caprolactam, and the like.

The most desirable proportions of lactam and ester to be used in any instance will depend somewhat on the nature of the particular ester polymerized. With the higher molecular weight polymerizable esters of 20 to 30 carbon atoms it is preferred to use 10 or more moles of N-vinyl lactams. The exact proportions depend also on the intended use for the products. Branched chain esters usually require a smaller proportion of N-vinyl lactam than do straight-chain esters to provide copolymers of equal solubility in water. A smaller proportion of N-vinyl butyrolactam than of N-vinyl caprolactam is required to provide copolymers of equal solubility in water.

The conventional polymerization catalysts used for polymerizing vinyl compounds can be used in the practice of this invention. Examples of these catalysts are peroxygen compounds represented by hydrogen peroxide, the diacyl peroxides, e. g., diacetyl, dibenzoyl, and dilauroyl peroxides; the dialkyl peroxides, for example, di(tertiary-butyl)-peroxide; inorganic peroxides, such as barium peroxide and zinc peroxide; and salts of inorganic peroxygen acids, e. g., ammonium, potassium and sodium persulfate. Di(tert.-butyl) peroxide and hydrogen peroxide are much more effective than benzoyl peroxide. Another type of polymerization catalyst is the azo type which is described below and which is the most useful and is preferred.

By an azo type catalyst is meant a compound containing the azo linkage, —N=N—. Examples of azo catalysts useful in the practice of this invention include alpha,alpha'-azobis-(alpha, gamma - dimethylvaleronitrile), alpha,alpha'-azobis(alpha-methyl butyronitrile), alpha,alpha'-(alpha-ethyl butyronitrile), alpha,alpha'-azodiisobutyramide, dimethyl and diethyl alpha,alpha'-azodiisobutyrate.

The catalyst should be employed in an amount in excess of 0.01% (based on the total weight of the monomers) and preferably within the range of between 0.2 and 2.0% of catalyst.

While the invention can be operated at temperatures in excess of 40° C., the preferred range for azo catalysts is from 60 to 100° C., since within these temperature limits the majority of compounds employed polymerize at a satisfactory rate and in such a manner that the reaction is readily controllable. With peroxide catalysts higher temperatures, preferably 125 to 250° C., should be used to obtain equivalent results. Di(tert.-butyl)peroxide gives the same type of polymer at 132° C. as azo catalysts give at 60° C.

As illustrated by the examples, the process of this invention can be operated in either open or closed reactors, with or without agitation. It is in general preferable to use a closed vessel to carry out the copolymerization because, ordinarily, more satisfactory water-soluble copolymers are produced in this manner. In many instances, agitation is useful as a means of accelerating the reaction.

The copolymerization can be carried out in bulk, that is, on a coherent mass of the N-vinyl lactam and polymerizable ester, or in the presence of a diluent such as water, alcohol, e. g., ethyl alcohol, or mixtures of water and alcohols, organic esters, e. g., ethyl acetate, ethers, e. g., dioxane, hydrocarbons and halogenated hydrocarbons, e. g., benzene, chlorobenzene, and trichloroethylene.

The products of this invention are valuable as assistants for promoting wetting, penetrating, deterging, dispersing, emulsifying, frothing, foaming and kindred phenomena in the textile, leather, paper, lacquer, rubber and like industries.

As many apparently widely different embodiments of this invention may be made without departing from the spirit and scope thereof, it is to be understood that I do not limit myself to the specific embodiments thereof except as defined in the appended claims.

I claim:

1. The copolymerization product of a N-vinyl lactam and a polymerizable ester of a monocarboxylic acid in the proportion of from 5 to 30 moles of the N-vinyl lactam for each mole of said ester, said ester containing 8 to 30 carbon atoms, and being selected from the group consisting of vinyl esters of aliphatic monocarboxylic acids and alkyl esters of acrylic and methacrylic acids.

2. A surface-active agent comprising the copolymerization product of a N-vinyl lactam and a polymerizable ester of a monocarboxylic acid in the proportion of from 5 to 30 moles of the N-vinyl lactam for each mole of said ester, said ester containing from 8 to 30 carbon atoms.

3. A surface-active agent comprising the copolymerization product of N-vinylbutyrolactam and vinyl laurate in the proportion of from 5 to 30 moles of the N-vinylbutyrolactam for each mole of vinyl laurate.

4. A process for obtaining surface-active agents which comprises polymerizing in contact with a vinyl polymerization catalyst at a temperature of from 40° C. to 250° C., a N-vinyl lactam and a polymerizable ester of a monocarboxylic acid in the proportion of from 5 to 30 moles of the N-vinyl lactam for each mole of said ester, said ester containing from 8 to 30 carbon atoms, and being selected from the group consisting of vinyl esters of aliphatic monocarboxylic acids and alkyl esters of acrylic and methacrylic acids.

5. The process set forth in claim 4 in which said N-vinyl lactam is N-vinylbutyrolactam and said ester is vinyl laurate.

JAMES H. WERNTZ.

REFERENCES CITED

The following references are of record in the file of this patent:

UNITED STATES PATENTS

| Number | Name | Date |
|---|---|---|
| 2,335,454 | Schuster et al. | Nov. 30, 1943 |